United States Patent [19]

Wiebe et al.

[11] Patent Number: 4,700,784
[45] Date of Patent: Oct. 20, 1987

[54] COMBINED DEPTH-CONTROL AND WING-LIFT HYDRAULIC CIRCUIT

[75] Inventors: Kenneth J. Wiebe, Dundas; J. Richard Harwood, Innerkip; Russell J. Martin, Ohsweken, all of Canada

[73] Assignee: J. I. Case Company, Racine, Wis.

[21] Appl. No.: 824,415

[22] Filed: Jan. 31, 1986

[51] Int. Cl.$^4$ ............................................. A01B 73/02
[52] U.S. Cl. .................................... 172/126; 172/311; 172/413; 280/43.23
[58] Field of Search ............... 172/311, 126, 130, 413, 172/456, 127, 128; 280/42, 23

[56] References Cited

U.S. PATENT DOCUMENTS

| | | | |
|---|---|---|---|
| 3,511,316 | 5/1970 | Oerman | 172/126 |
| 3,587,750 | 6/1971 | Cantral | 172/130 |
| 3,666,284 | 5/1972 | Hunter | 172/413 |
| 3,669,195 | 6/1972 | Green | 172/311 |
| 3,918,529 | 11/1975 | Frager | 172/413 |
| 4,030,551 | 6/1977 | Boetto | 172/126 |
| 4,067,394 | 1/1978 | Deckler | 172/130 |
| 4,249,616 | 2/1981 | Moe | 172/311 |
| 4,285,268 | 8/1981 | Deckler | 172/2 |
| 4,337,959 | 7/1982 | Bettin | 172/413 |
| 4,346,763 | 8/1982 | Swanson | 280/43.23 |
| 4,354,688 | 10/1982 | Swanson | 280/43.23 |
| 4,365,672 | 12/1982 | Robinson, Jr. | 172/127 |
| 4,381,036 | 4/1983 | Fardal | 172/130 |

OTHER PUBLICATIONS

Krause Wing Chisel Plow (730A-740A), advertising brochure of Krause Plow Corp. Hutchinson, Ka., 9/1972.

Primary Examiner—Richard J. Johnson
Attorney, Agent, or Firm—Dressler, Goldsmith, Shore, Sutker & Milnamow, Ltd.

[57] ABSTRACT

A combined depth-control and wing-lift hydraulic circuit is disclosed. The circuit is preferably used in combination with a farm implement having a tool bar. The tool bar is horizontally disposed relative to the ground, and is carried by the implement. The hydraulic circuit comprises means to raise and lower the tool bar relative to the ground, thereby to effect depth control. The tool bar includes pivotally connected wings. Each wing carries an associated wing wheel. The hydraulic circuit includes means for causing rotative movement of each wing about its associated tool bar pivot between a substantially horizontally-disposed position and a substantially vertically-disposed position, relative to the ground, and for further causing each wing to be selectively disposed at one of these positions, thereby to effect wing lift. Each wing wheel is coupled to, and is distally spaced from and located beneath, its associated wing structure when such wing is in the substantially horizontally-disposed position. Also, each wing wheel is outwardly spaced from its associated wing structure when the wing is in the substantially vertically-disposed position. The hydraulic circuit further includes means for causing each wing wheel to be drawn inwardly toward its associated wing structure when such wing is in the substantially vertically-disposed position, thereby to effect a special "wheel-tuck" feature of the present invention. The hydraulic circuit can additionally be used to control operation of a marker arm for forming marker furrows.

16 Claims, 6 Drawing Figures

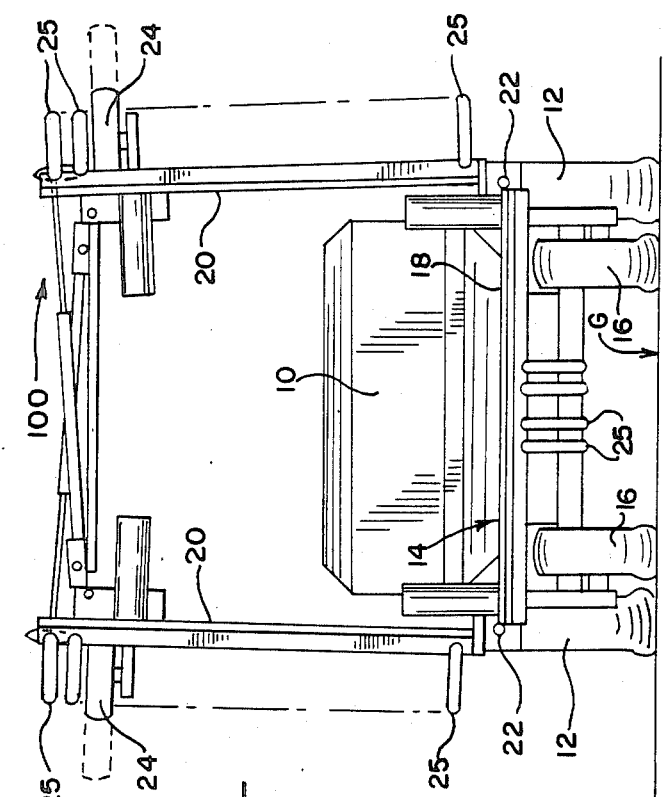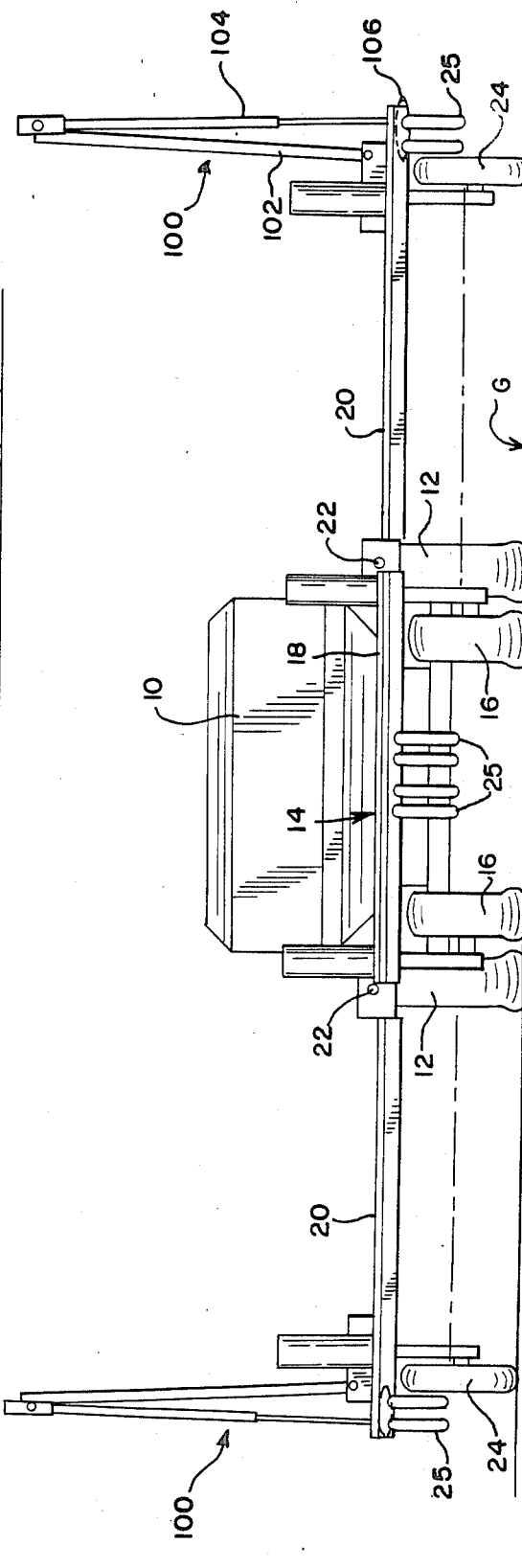

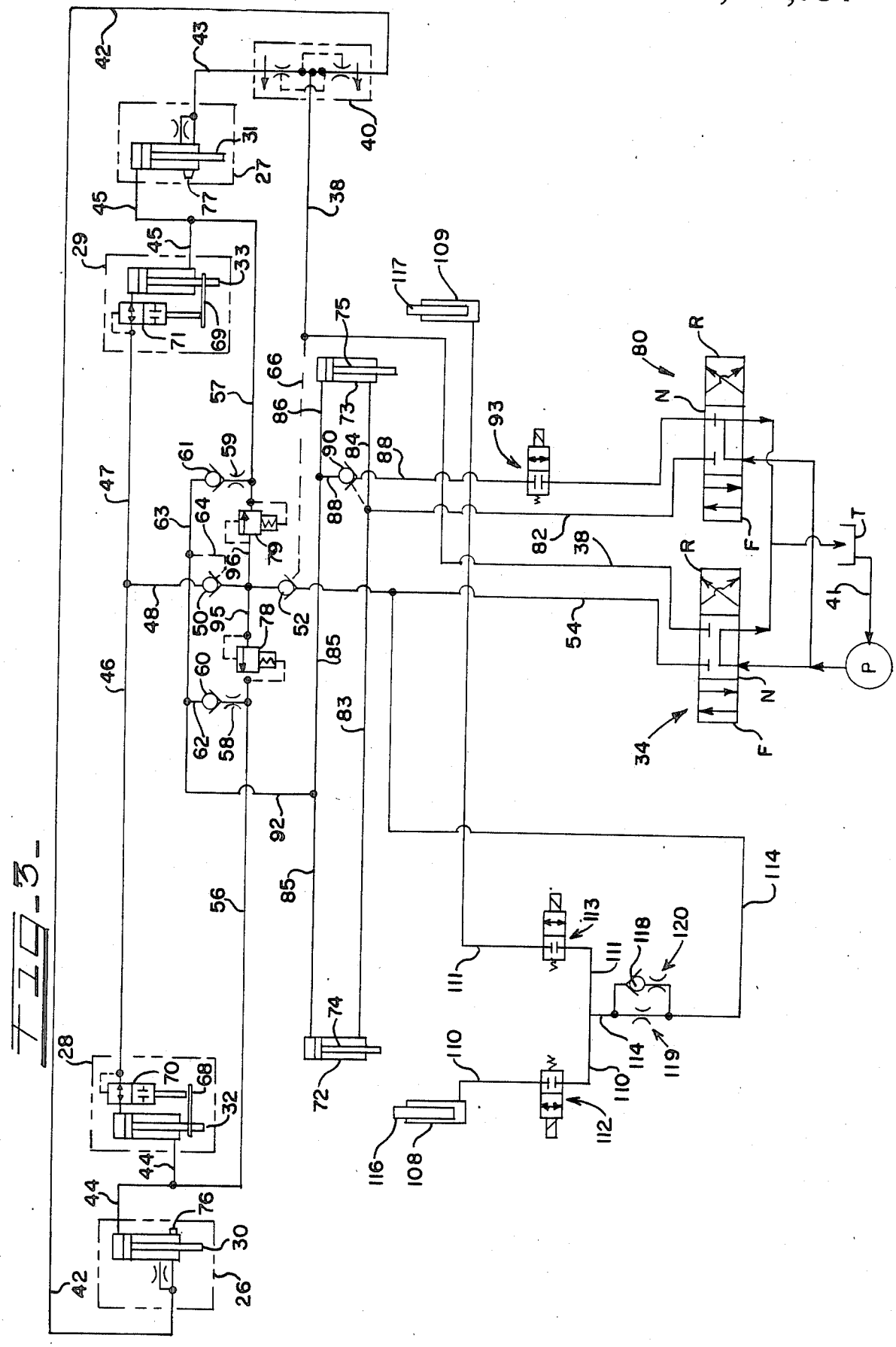

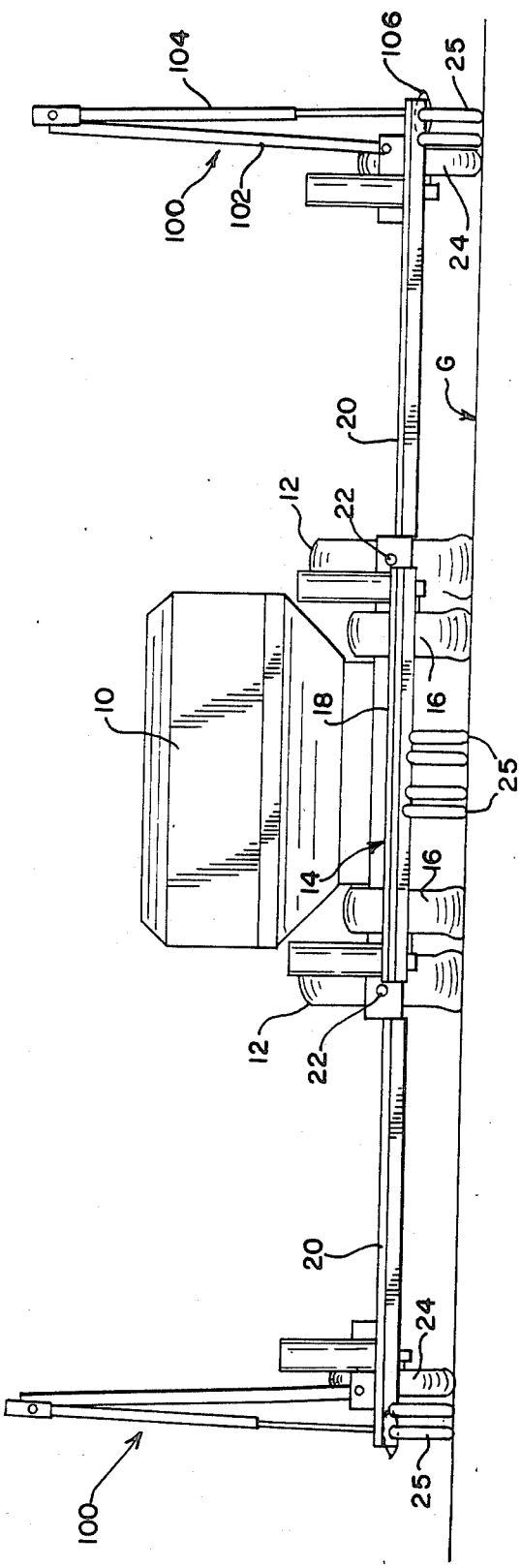
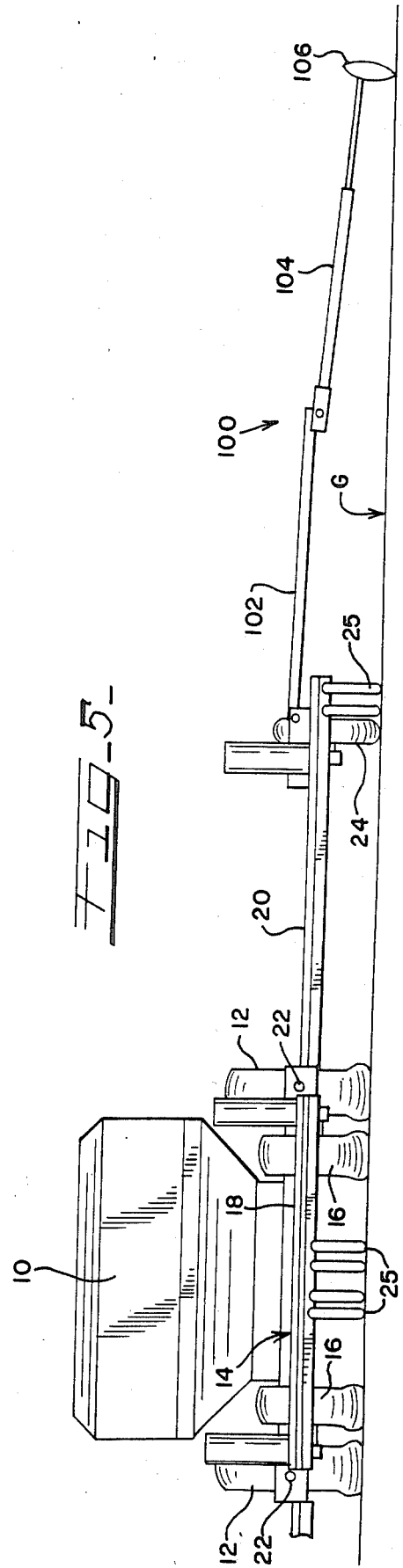

COMBINED DEPTH-CONTROL AND WING-LIFT HYDRAULIC CIRCUIT

TECHNICAL FIELD OF THE INVENTION

The present invention is directed to a hydraulic circuit used in connection with a wheeled farm implement having an elongated, substantially horizontally disposed tool bar. The tool-bar implement includes a pair of wings, each of which is connected through a pivot to a respective end portion of the tool bar. Each wing is partially rotatable, about its associated pivot, from a substantially horizontally disposed position to a substantially vertically disposed position relative to the ground. Each wing carries a wing wheel, spaced in distal relation from the associated wing pivot. Each wing wheel depends (i.e. extends downwardly) from its respective wing when the wing is in the horizontally disposed position.

More particularly, the present invention is directed to a hydraulic circuit, carried by the farm implement, which causes the wings to be pivotally rotated or "folded up" into the substantially vertically disposed position and to be pivotally rotated back down to the substantially horizontally disposed position. This function, served by the circuit, is referred to as "wing lift". The hydraulic circuit of the present invention further causes the tool bar to be raised and lowered relative to the ground. This function is referred to as "depth control". The hydraulic circuit of the present invention also causes each wing wheel to be drawn toward its associated wing structure when the wing is in the substantially vertically disposed position, for reducing the effective width of the farm implement. This function, served by the circuit, is referred to as "wheel tuck."

BACKGROUND OF THE INVENTION

A row planter is an agricultural machine that, when pulled by a tractor, opens a furrow in the soil, places seeds at appropriate spaced intervals in the furrow, and loosely covers the seeds with moist earth. A conventional row planter generally includes a disk for forming a furrow in the soil and a press wheel for covering each seed with moist, loosely packed earth after the seed has been deposited in the furrow.

A row unit plants a single row of seeds in a field. Conventionally, farmers pull a plurality of such row units, attached to a farm implement behind their tractors. In order to attach more than one row unit to the tractor, farmers generally use an elongated articulated or pivotable tool bar, which attaches to the tractor like a trailer. The individual row units are attached, at suitable spaced intervals, substantially along the entire length of the tool bar. The weight of the tool bar, and associated row units mounted thereon, is supported by wheels mounted to the tool bar at suitable positions along the length of the tool bar. The farmer uses his tractor to pull the tool bar through a field. In this way, a farmer can plant seeds in a plurality of rows simultaneously. These rows may form a path two to three times as wide as the distance between the tractor rear wheels, as the tractor operator makes a single pass through the field.

The articulated tool bar generally comprises an elongated, intermediate tool bar portion, substantially horizontally disposed relative to the ground, and a pair of wings, each of which is pivotally connected to a respective end portion of the intermediate tool bar portion. Each wing is partially rotatable, about its associated pivot, from a substantially horizontally disposed position to a substantially vertically disposed position relative to the ground. When the tool bar is lowered toward the ground, the individual disks and press wheels of each row unit make contact with the ground. Thus lowered, the tool bar is in the so-called "working position". When the tool bar and associated disks and press wheels are raised relative to the ground and the wings disposed vertically as discussed above, the tool bar is in the so-called "transport position". Typically, on commercial farm equipment, when the wings are folded up in transport position, the wing wheels remain extended.

The intermediate tool bar portion generally has at least two wheels, each of which is positioned at a respective end of the intermediate tool bar portion. In addition, each wing has a wheel, mounted along the wing underside, spaced from its associated pivot.

Conventional tool bars further include a marker device, mounted at the distal end of one of or both of the pair of wings, for forming marker furrows in the soil. See, for example, U.S. Pat. No. 3,556,226 to Brewer et al. Each marker furrow, when formed, is spaced parallel from the row-unit furrows being formed, as a farmer makes a pass through the field. After the farmer makes a U-turn to make a subsequent pass, he will generally center his tractor on the just-formed marker furrow of the prior pass to avoid overlap of row-unit furrows or the possibility of unworked areas of field (i.e., so-called "skips") forming between row-unit furrows.

Conventional row planters have depth-control means for raising and lowering the tool bar relative to the ground, and separate wing-lift means for folding the wings up into a generally upright position to reduce actual tool bar width when the tool bar is being transported through the field. Unfortunately, separate means for performing these two functions usually requires using two separate hydraulic systems, which can be costly and add unwanted bulk to an already rather complex machine. A single system which performs both of the depth-control and wing-lift functions, described above, is currently in great demand. Further, it is occasionally desirable to be able to draw the wing wheels in toward associated wing structure, when the wings are raised, to further reduce the overall implement width.

SUMMARY OF THE INVENTION

The present invention is a combined depth-control and wing-lift hydraulic circuit, carried by the tractor and/or the farm implement. The single hydraulic circuit raises and lowers the tool bar relative to the ground and also causes rotation of the wings, about each associated tool-bar pivot, between substantially horizontally disposed and substantially vertically disposed positions relative to the ground. In addition to performing the depth-control and wing-lift functions, however, the circuit also performs the wheel-tuck function described above. That is the hydraulic circuit also causes both wing wheels to be drawn inwardly toward associated wing structure when the wings are in the substantially vertically disposed position to decrease overall transport width of the farm implement. still further, the single hydraulic circuit of the present invention can be used to actuate marker arm device. Details, as to how the hydraulic circuit of the present invention can aditionally be used to control the operation of marker arm devices, are presented below.

BRIEF DESCRIPTION OF THE DRAWINGS

FIG. 1 is a trailing end or backside view of a wheeled farm implement having a wheeled tool bar mounted to the backside thereof;

FIG. 2 is a backside view of the farm implement, similar to the view of FIG. 1, illustrating the wing-lift and wheel-tuck functions of the hydraulic circuit;

FIG. 3 is a schematic drawing of a preferred embodiment of the hydraulic circuit of the present invention;

FIG. 4 is a backside view of the farm implement of FIG. 1, illustrating the depth-control function of the hydraulic circuit;

FIG. 5 is a partially fragmented backside view of the farm implement of FIG. 4, illustrating the marker-control capability of the hydraulic circuit of the present invention;

DETAILED DESCRIPTION OF THE PREFERRED EMBODIMENTS

Figure 6:
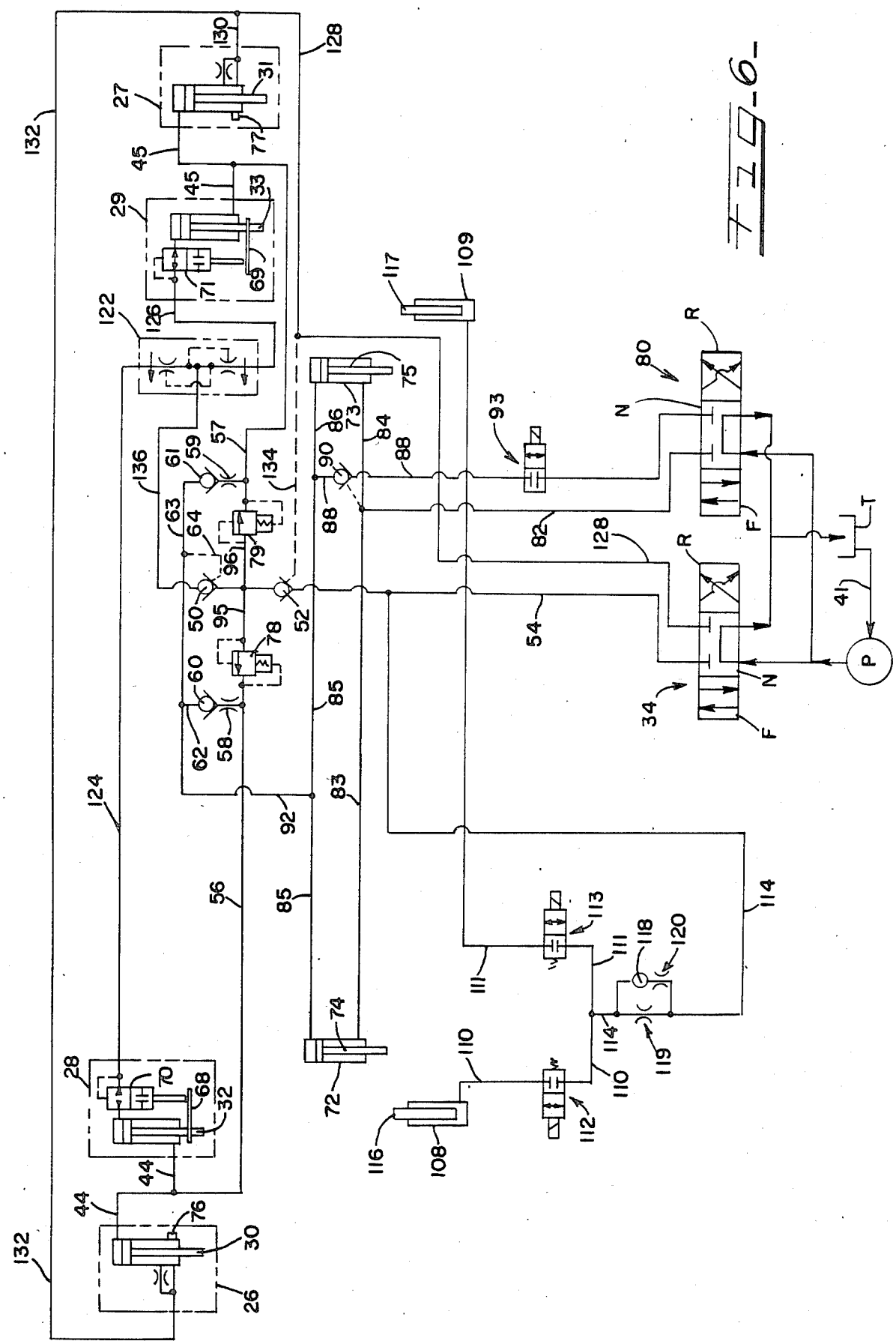
FIG. 6 is a schematic drawing of another preferred embodiment of the hydraulic circuit of the present invention.

While the invention will be described in connection with the illustrated preferred embodiments, it will be understood that it is not intended to limit the invention to these embodiments. On the contrary, the present invention is to cover all structural or functional alternatives or equivalents as defined by the appended claims.

Referring initially to FIG. 1, a farm implement 10 is shown. The implement 10 is mounted on wheels 12 which support the weight of the implement 10 on the ground G. The wheeled farm implement 10 has attached to its backside an articulated, elongated frame or tool bar 14, which is itself mounted on wheels 16 and 24. The wheels 16 and 24, in turn, support the weight of the frame 14 on the ground G.

The frame or tool bar 14 comprises an elongated intermediate tool bar portion 18, disposed substantially horizontally relative to the ground G. The tool bar 14 further includes a pair of wings 20, each of which is connected to an end portion of the intermediate tool bar portion 18 through an associated pivot pin 22, located at each of the respective end portions of intermediate tool bar portion 18. The pivot pins 22, serving as flexible connectors, provide the tool bar 14 with the articulation feature briefly mentioned above. Also, the height of the wings 20, relative to the intermediate tool bar portion 18, is adjustable.

Each wing 20 has an associated wing wheel 24, affixed to the wing 20 at a wing end portion opposite the wing pivot pin 22, for supporting a portion of the weight of the wing 20 on the ground. The intermediate tool bar wheels 16 support the rest of the weight of the wings 20.

It is to be understood that the weight of the frame 14, comprising the weight of the intermediate tool bar portion 18 and wings 20, includes the weight of ground tools 25 mounted to the frame 14 along the entire length thereof. Although only a few ground tools 25 are shown in FIGS. 1, 2, 4 and 5, it is to be understood that such a depiction is merely illustrative so as to more clearly show selected features of the present invention. Thus it is understood that a plurality of ground tools 25 are in fact fixed to the frame 14, along the entire length thereof at suitably spaced intervals, so that the ground tools 25 can form the plurality of row-unit furrows, mentioned above, when the frame 14 is lowered (FIGS. 4 and 5) relative to the ground G. As shown in FIGS. 1 and 4, the effective width of the tool bar 14 is approximately three times the distance between the implement wheels 12. Thus, frame wheels 16 and 24 in fact support considerable weight.

The wing-lift function is illustrated in FIG. 2. The depth-control function is illustrated by FIGS. 1 and 4. The hydraulic circuit of the present invention precludes wing-lift when the frame 14 is lowered to the ground G in the working position (FIGS. 4 and 5). To effect wing-lift, the hydraulic circuit first causes the frame 14 to be raised relative to the ground G (FIG. 1). Then the hydraulic circuit causes the wings 20 to be folded up, as shown in FIG. 2, for wing-lift. In reversing this process, the circuit also first causes the wings 20 to be pivoted from the vertical to the horizontal dispositions relative to the ground G before the frame 14 is lowered to the working position.

Reference is invited back to FIG. 2 where the wings 20 are shown folded up, to reduce the effective width of the tool bar 14 when in the transport position for a preselected period of time, such as the period of time necessary to transport the implement 10 from one work area of a square, 2000-acre farm to another work area at the extreme other end of the farm, a distance of 2.5 miles away. The intermediate tool bar portion 18 is substantially horizontally disposed and the wings 20 are substantially vertically disposed, relative to the ground G, when in the wing-lift version of the transport position, when it is desirable to reduce effective width of the frame 14. Otherwise, the wings 20 are left down, thus being disposed essentially co-linearly with the intermediate tool bar portion 18, in the transport position (FIG. 1) when reduction of frame width is not a matter of consideration.

The wheel-tuck function, also illustrated in FIG. 2, will now briefly be discussed. With the wings 20 disposed upwardly, the wing wheels 24 would normally distend outwardly from the wings 20, as is shown by phantom line, and thus would outwardly distend from the sides of farm implement 10. As mentioned above, however, it is occasionally desirable to be able to draw the wing wheels 24 inwardly toward associated wing structure to decrease the overall transport width of the farm implement 10. Accordingly, the hydraulic circuit of the present invention includes means for causing the wings 20 to be lifted up into the vertical position, thus effecting wing-lift. In addition, however, the wing-lifting means co-operates with frame raising-and-lowering means to cause the wing wheels 24 to be drawn inwardly toward the wings 20, as is shown in heavy line in FIG. 2, to decrease the overall transport width of the farm implement 10 for a preselected period of time, such as the period of time necessary to transport the implement 10 through the doorway of a barn or storage facility.

FIG. 3 is a schematic of the hydraulic circuit of the present invention. The hydraulic circuit of the present invention can be used in combination with a wide variety of implements. For example, some implements may have frame elements raisable and lowerable relative to the ground G. The circuit can also be used to actuate additional elements, such as frame wings or marker arms, which can be folded vertically.

The illustrated hydraulic circuit has a master-slave depth-control feature for raising or lowering a tool bar 14 relative to the ground G, for a period of time which is at least that period of time mentioned above in connection with transport from one work area to another. The illustrated circuit includes means for vertically disposing associated wings 20 relative to the ground G. Additionally, the hydraulic circuit causes wing wheels 24 to be drawn inwardly toward associated vertically-disposed wing structure, to decrease overall transport width.

Referring now to FIG. 3, the hydraulic circuit for effecting the depth-control (FIGS. 1 and 4), the wing-lift (FIGS. 1 and 2) and the wheel-tuck (FIG. 2) functions, described above, will now be discussed. Additional, optional features as well as a second embodiment of the hydraulic circuit of the present invention will be discussed further below.

With the wings 20 lowered (i.e. disposed parallel to the ground G), depth-control slave cylinders 26 and 27 and associated depth-control master cylinders 28 and 29, are fully extended. This causes the tool bar 14 to be raised to the transport position by the frame wheels 16 and 24, as shown in FIG. 1. The slave and master cylinders include respective associated extendable-and-retractable slave-cylinder piston rods 30 and 31 and associated extendable-and-retractable master-cylinder piston rods 32 and 33. To lower the tool bar 14 to the working position (FIG. 4), a depth-control valve 34 is actuated to cause hydraulic fluid to flow through a hydraulic fluid line 38 and into a flow divider/combiner valve 40.

The depth-control valve 34 is a conventional three-position hydraulic valve having a forward F position, a reverse R position, and a neutral N position. The tractor operator positions the depth-control valve 34 into one of these three positions to selectively control flow of hydraulic fluid from a pump P, through a selected portion of the hydraulic circuit shown in FIG. 3, and back into a tank T. From tank T, hydraulic fluid is returned to the pump P via return pipe 41.

Those elements of the hydraulic circuit (FIG. 3) which co-act to cause the frame 14 to be lowered relative to the G, into the working position (FIG. 4), will now be discussed. To direct flow of hydraulic fluid from pump P into the divider/combiner valve 40, the depth-control valve 34 is set in the R position. Briefly, the divider/combiner valve 40 causes the hydraulic fluid, flowing therethrough, to be substantially equally divided between the depth-control slave cylinders 26 and 27, via respective associated hydraulic fluid lines 42 and 43. Each slave cylinder 26 and 27 includes an orificed port and further includes a respective associated rephasing port 76 and 77. The rephasing ports 76 and 77 will be described below in connection with the depth-control feature of the present invention.

Flow of hydraulic fluid from the piston side of the depth-control slave cylinders 26 and 27 is directed to the rod side of each of the associated depth-control master cylinders 28 and 29, via respective associated hydraulic fluid lines 44 and 45. Flow of hydraulic fluid from both of the depth-control master cylinders 28 and 29 is directed, via respective associated hydraulic fluid lines 46 and 47, into hydraulic fluid line 48 where the hydraulic fluid flowing from both master cylinders 28 and 29 is combined. Flow of hydraulic fluid from hydraulic fluid line 48 is then directed, first through sequential pilot-operated flow-check valves 50 and 52 and thereafter, via hydraulic fluid line 54, back through valve 34 and into tank T.

During lowering of the tool bar 14 relative to the ground G, hydraulic fluid pressure in hydraulic fluid lines 56 and 57, which respectively communicate with hydraulic lines 44 and 45, is sufficient to keep the pilot-operated flow-check valve 50 in the "open" position. That is, to keep flow-check valve 50 open, hydraulic fluid in hydraulic fluid lines 56 and 57 is caused to flow through respective associated orifices or flow restrictors 58 and 59, next through respective associated flow-check valves 60 and 61, and thereafter into respective associated hydraulic fluid lines 62 and 63. Both fluid lines 62 and 63 communicate with the pilot-operated flow-check valve 50 via pilot hydraulic fluid line 64.

Also, during lowering of the tool bar 14 relative to the ground G, hydraulic fluid pressure in hydraulic fluid line 38, sensed at the pilot-operated flow-check valve 52 via pilot hydraulic fluid line 66, is similarly sufficient to keep the pilot-operated flow-check valve 52 in its open position.

As the depth-control slave cylinders 26 and 27 are pressurized to lower the tool bar 14, the respective associated slave-cylinder piston rods 30 and 31 continue to retract. This in turn forces hyraulic fluid into the rod sides of the associated master cylinders 28 and 29 thereby causing the associated master-cylinder piston rods 32 and 33 to retract until associated depth-stop collars 68 and 69, mounted on respective associated master-cylinder piston rods 32 and 33, are caused to make contact with respective associated poppet valves 70 and 71. The poppet valves 70 and 71 function by blocking flow of hydraulic fluid from the depth-control master cylinders 28 and 29 through respective associated hydraulic fluid lines 46 and 47. Such action by the poppet valves 70 and 71 thus causes the master cylinders 28 and 29, and the associated slave cylinders 26 and 27, to stop retracting. In the event that one of the master-cylinder piston rods 32 (or 33) stops retracting by making contact with its associated depth-stop collar 68 (or 69) before the other piston rod makes contact, such other piston rod is able to continue retracting because the flow divider/combiner valve 40 functions to allow hydraulic fluid to flow out of the unblocked part of the hydraulic circuit, thereby permitting such other piston rod to continue retracting to its associated stop collar 68 (or 69).

Each depth-stop collar 68 and 69 is adjustable along a portion of its associated piston rod 31 and 32 to control the "depth" or degree of penetration of ground tools 25 into the soil, and to control the disposition of the tool bar 14 relative to the ground G. Also, wing depth-control slave cylinder rod anchor points (not shown) are adjustable to control the height of the wings 20 relative to the intermediate tool bar portion 18.

To raise the tool bar 14 to the transport position, the tractor operator positions the depth-control valve 34 into the F position. Hydraulic fluid from pump P then flows, via hydraulic, fluid line 54, through the pilot-operated check-flow valves 50 and 52. Hydraulic fluid, exiting flow-check valve 50, then flows through hydraulic fluid line 48, and hydraulic fluid flow thereafter is split between hydraulic fluid lines 46 and 47. Hydraulic fluid pressure in hydraulic fluid lines 46 and 47 is respectively sensed by associated poppet valves 70 and 71. The valves 70 and 71, thus sensing pressure of hydraulic fluid, react to permit hydraulic fluid to flow, via hydraulic fluid lines 46 and 47, into the piston sides of the associated depth-control master cylinders 28 and 29. Flow of hydraulic fluid into the piston sides of master cylinders 28 and 29 causes extension of the associated master-cylinder piston rods 32 and 33 which in turn causes hydraulic fluid to flow through associated hydraulic fluid lines 44 and 45. From hydraulic fluid lines 44 and 45, hydraulic fluid flows into the piston side of the associated slave cylinders 26 and 27, thereby causing associated slave-cylinder piston rods 30 and 31 to extend, thus raising the tool bar 14 relative to the ground G. Hydraulic fluid exiting the rod side of the depth-control slave cylinders 26 and 27 flows via associated hydraulic lines 42 and 43 back to tank T. That is, hydraulic fluid flowing through hydraulic fluid lines 42 and 43 is recombined in the flow divider/combiner valve 40 and returned to tank T via hydraulic line 38. Thus, when the tool bar 14 is raised relative to the ground G (FIG. 1), the depth-control piston rods 30-33 are fully extended.

It is desirable that the frame 14 be maintained level relative to the ground G. The presence of the pilot-operated flow-check valves 50 and 52 ensures against so-called "settling" of the tool bar 14, which typically occurs when the master cylinder rods 32 and 33 are fully extended. In the event that flow-check valve 50 is caused to unseat due to high pressures sensed in pilot line 64 (as communicated through hydraulic fluid line 63 from hydraulic fluid line 56 or 57), flow-check valve 52 will prevent hydraulic fluid flow from hydraulic fluid line 48 into hydraulic fluid line 54. Without flow-check valves 50 and 52 being present, the load of the tool bar 14, and associated ground tools 25, would eventually force hydraulic fluid back through hydraulic-fluid lines 46 and 47 which in turn would result in an undesired lowering of a portion of the tool bar 14. Thus, the net result of tool-bar settling is that after a period of time the tool bar 14 is no longer level with the ground G.

That portion of the hydraulic circuit of the present invention which causes the above-mentioned rephasing function to take place will now be described. Briefly, the tractor operator causes hydraulic fluid to actuate slave hydraulic cylinders 26 and 27 (FIG. 3) in unison. Slave hydraulic cylinders 26 and 27 have respective associated wing-cylinder piston rods 30 and 31.

In the event that one of the slave hydraulic cylinders 26 (or 27) reaches full extended stroke before the respective master cylinder 28 (or 29) associated with the particular wing 20 being raised, hydraulic fluid is caused by the hydraulic circuit, shown in FIG. 3, to bypass the slave-cylinder piston portion of the associated piston rod 30 (or 31), associated with the slave hydraulic cylinder 26 (or 27) which has reached full stroke, because of the presence of the earlier-mentioned rephasing ports 76 and 77. That is, in the event that a master cylinder 28 (or 29) reaches full extended stroke before its associated slave cylinder 26 (or 27), the rephasing ports 76 and 77 allow the piston rods 30 (or 31) to continue extending until full extension is achieved.

The tool bar 14 is kept level during the rod extension-and-retraction actuation cycles of the slave-cylinder and master-cylinder piston rods 30-33 by the presence of the flow-check valves 60 and 61, both of which function independently and co-operatively to prevent transfer of hydraulic oil from one slave-and-master cylinder pair 26 (or 27) and 28 (or 29) to the other pair. In the absence of flow-check valves 60 and 61, such hydraulic fluid transfer would otherwise occur via hydraulic fluid lines 56 and 57. Further assisting in the leveling of the tool bar 14, during the piston-rod extension-and-retraction phases, is the flow divider/combiner valve 40. As briefly mentioned above, the divider/combiner valve 40 proportions hydraulic fluid flow substantially equally between each of the slave-and-master cylinder pairs. One such pair includes the cylinders 26 and 28; the other pair includes the cylinders 27 and 29, shown in FIG. 3. If one pair of slave-and-master cylinders 26 and 28 (or 27 and 29) should reach full extension or retraction before the other pair, hydraulic fluid flow to the flow divider 40 will cease in whichever of the hydraulic fluid lines 42 or 43 that is associated with the slave-and-master cylinders that have reached full extended stroke. Hydraulic fluid continues to flow, however, to the other slave-and-master cylinder pair until they, too, reach full stroke.

To fold the wings 20 up thereby effecting the wing-lift function described above, the tractor operator moves a three-way hydraulic-fluid wing-lift flow-control valve 80 into its forward F position. Pump P then transfers hydraulic fluid through hydraulic fluid line 82 to pressurize the rod side of the wing raising/lowering hydraulic cylinders 72 and 73. From pump P, hydraulic fluid flows through control valve 80 and hydraulic fluid line 82, and thereafter "tees" into hydraulic fluid lines 83 and 84. Lines 83 and 84 respectively supply associated cylinders 72 and 73 with hydraulic fluid. Hydraulic fluid exiting cylinders 72 and 73 flows, via associated hydraulic fluid lines 85 and 86, into hydraulic fluid return line 88 and through pilot-operated flow-check valve 90 and is thereafter returned to tank T. The hydraulic fluid pressure in hydraulic fluid line 82 is sufficient to keep the flow-check valve 90 in the "open" position. Thus, when the wings 20 are folded upwardly and the frame 14 raised relative to the ground G (FIG. 2), the wing-lift piston rods 74 and 75 are fully retracted.

To draw the wing wheels 24 inwardly toward associated wing structure after the wings 20 have been folded upwardly as shown in FIG. 2, the wing-lift control valve 80 and depth-control valve 34 are operated simultaneously. As the wing-lift control valve 80 is moved into its F position, the depth-control valve 34 is moved into its R position. See FIG. 3. Hydraulic fluid is then caused to flow from pump P, via hydraulic-fluid line 38, through the flow divider/combiner valve 40 and to the rod side of the depth-control slave cylinders 26 and 27. Hydraulic fluid from the piston side of the slave cylinders 26 and 27 is first caused to flow through associated hydraulic fluid lines 56 and 57, then through the associated flow restrictors 58 and 59, thereafter through the associated flow-check valves 60 and 61, and finally back to tank T by way of the wing-lift control valve 80. That is, hydraulic fluid exiting flow-check valves 60 and 61, via associated hydraulic fluid lines 62 and 63, is combined in hydraulic fluid line 92. Hydraulic fluid from hydraulic fluid line 92 communicates, via hydraulic fluid line 85, with return line 88 which directs flow of hydraulic fluid through wing-lift valve 80 and back to tank T. At this point, the slave cylinder rods 32 and 33 are fully retracted and the master cylinder rods 30 and 31 are fully extended.

The hydraulic fluid pressure in hydraulic fluid line 82 is sufficient to keep the pilot-operated flow-check valve 90 in the "open" position to permit hydraulic fluid to flow through return line 88. The flow restrictors 58 and 59, which are associated with respective hydraulic-fluid lines 62 and 63, limit the flow rate of hydraulic fluid to insure that the back pressure in hydraulic-fluid lines 62 and 63 is not so great as to open the pilot-operated check valve 50. In this way, the tool bar 14 is thus prevented from lowering to the "working" position (FIG. 4) while the wing wheels 24 are being retracted (FIG. 2). In particular, while the wing wheels 24 are thus being retracted (by virtue of hydraulic fluid flowing in hydraulic fluid lines 38 and 43 as stated above), the hydraulic fluid pressure in line 38 is sufficient to maintain the pilot-operated flow-check valve 52 in the "open" (i.e. unseated) position. With flow-check valve 52 open, flow-check valve 50 must be closed to prevent the tool bar 14 from lowering. In other words, if flow-check valve 50 is not present, flow-check valve 52 would periodically unseat due to periodic bursts of high fluid pressure sensed via pilot line 66, and the tool bar 14 would lower. This, however, is undesirable.

In the "wheel-tuck" position, the slave cylinder rods 30 and 31, associated with the tucked-in wing wheels 24, are fully retracted as are the wing-cylinder piston rods 74 and 75. As an added safety feature, the intermediate tool bar 18 is not accidentally lowerable when the wing wheels 24 are tucked in (FIG. 2). That is, because hydraulic cylinder rods 30 and 31 are already fully retracted in the "wheel-tuck" situation, accidentally moving depth-control valve 34 to the "R" position cannot cause the intermediate tool bar 18 to lower (FIG. 3).

A solenoid-operated spring-biased flow-control valve 93 insures proper sequencing of the depth-control and wing-folding features of the hydraulic circuit shown in FIG. 3. That is, the wings 20 are folded upwardly (FIG. 2) only after the tool bar 14 has first been raised relative to the ground G (FIG. 1). Similarly, through operation of the solenoid-operated valve 93, the tool bar 14 is lowered only after the wings 20 have first been folded back down to the horizontal.

To extend the wing wheels 24 from their associated wing structure before the wings 20 are lowered, the tractor operator moves the depth-control valve 34 to its F position. Moving depth-control valve 34 to the F position causes pump P to pressurize hydraulic-fluid line 54 with hydraulic fluid. Because the master-cylinder rods 32 and 33 are already fully extended, the hydraulic fluid in hydraulic fluid line 54 is caused to flow into hydraulic fluid lines 95 and 96, rather than into hydraulic fluid lines 46 and 47 via hydraulic fluid line 48. Hydraulic fluid in lines 95 and 96 is thereafter by-passed, through the associated spring-biased pressure-relief valves 78 and 79, to the piston side of the slave hydraulic cylinders 26 and 27 via hydraulic fluid lines 56 and 57. While the slave cylinder rods 30 and 31 are being extended, flow of hydraulic fluid exiting the slave cylinders 26 and 27 is caused to flow into hydraulic-fluid lines 42 and 43. Extension of piston rods 30 and 31 in turn causes hydraulic fluid to flow through associated hydraulic-fluid lines 42 and 43 back into the flow divider/combiner valve 40. Exiting the flow divider/combiner valve 40, hydraulic fluid then is returned to tank T via hydraulic fluid line 38 and depth-control valve 34.

Reference is next invited to FIGS. 4 and 5 for the purpose of briefly discussing the above-mentioned optional marker-control feature of the hydraulic circuit (FIG. 3) of the present invention. The farm implement 10 generally includes a hydraulically-operated row marker 100 to permit a tractor operator to form marker furrows in the soil for reasons discussed above. As also mentioned above, some farm implements have only one marker device mounted thereto. The illustrated farm implement, however, has a pair of marker devices 100 mounted to its frame 14; and the hydraulic circuit shown in FIG. 3 can selectively control the function of each marker device 100, independent of the other marker device 100.

The hydraulically-operated row marker 100 shown in FIGS. 1, 2, 4 and 5 comprises a first elongated member 102 pivotally connected, at a first end portion thereof, to the respective end portion of an associated wing 20. Each such point of connection of member 102 to associated wing 20 is in distal relation to the intermediate tool bar portion 18. The row marker 100 further includes a second elongated member 104, pivotally connected at an end portion thereof, to that end portion of the first member 102 which is opposite the connection to the associated wing 20. A disk 106, which forms the marker furrow mentioned above, is connected to the other end of the second member 104.

Normally, when one of the marker disks 106 is not being used to form a furrow, the members 102 and 104 of that marker device 100 are drawn together and disposed generally upwardly, as shown in FIGS. 1 and 4. Further, after both of the wings 20 have been folded up, the marker devices 100 are typically disposed generally inwardly, as shown in FIG. 2.

To use the disk 106 to form a marker furrow, the marker members 102 and 104 are caused by hydraulic fluid to extend outwardly from the associated wing 20, whereby the disk 106 makes contact with the ground G (FIG. 5) to form the marker furrow.

Referring now to FIG. 3, that portion of the hydraulic circuit which actuates the row markers 100 will now be discussed. The marker-controlling portion of the hydraulic circuit includes individual marker cylinders 108 and 109, each of which is supplied hydraulic fluid by a respective associated hydraulic-fluid line 110 and 111. Each hydraulic-fluid line 110 and 111 includes an associated spring-biased solenoid-operated flow-control valve 112 and 113. The valves 112 and 113 are independently actuated to permit hydraulic fluid to flow through associated hydraulic fluid lines 110 and 111, or to block flow of hydraulic fluid through these lines 110 and 111, as desired. The hydraulic-fluid lines 110 and 111 are together supplied hydraulic fluid by hydraulic fluid line 114. Line 114 in turn is supplied hydraulic fluid from pump P via depth-control valve 34, when, valve 34 is in the F position. That is, line 54 supplies hydraulic fluid to line 114.

Each marker cylinder 108 and 109 has an associated marker cylinder rod 116 and 117 for actuating an associated one of the markers 100 discussed above (see FIG. 5).

Generally, a tractor operator will choose to extend only one of the markers 100 to form a marker furrow. The presence of the solenoid-operated valves 112 and 113 permits the tractor operator to do so. When the marker cylinder rod 116 (or 117) is extended, the associated marker 100 is disposed essentially vertically, as shown in FIGS. 1 and 4.

The marker portion of the hydraulic circuit shown in FIG. 3 further includes a hydraulic-fluid flow-check valve 118 and parallel-connected flow orifices or restrictors 119 and 120. Valve 118 and restrictors 119 and 120 have all been incorporated into hydraulic-fluid line 114, as is seen by referring to FIG. 3. The presence of the flow-check valve 118, in combination with the flow restrictors 119 and 120, serves to lengthen the time necessary to extend the selected marker cylinder rod 116 (or 117), as compared to the time necessary to retract the marker cylinder rod 116 (or 117). This is an obvious personnel-safety feature; but it is a feature which also minimizes the likelihood of damaging a marker device 100. The result of the marker cylinder rod extension feature of the present invention is shown in FIG. 5. Each marker device 100 includes a spring (not shown) to cause an associated marker cylinder rod 116 (or 117) to force hydraulic fluid through hydraulic fluid line 114 for unfolding such marker 100.

After a selected marker cylinder rod 116 (or 117) has been extended, its associated solenoid-operated valve 112 (or 113) is actuated to block escape of hydraulic fluid from the associated marker cylinder 108 (or 109). When it is desirable to cause the associated marker cylinder rod 116 (or 117) to retract, the associated solenoid-operated valve 112 (or 113) is actuated by the tractor operator, whereby hydraulic fluid flows through both of the restrictors 119 and 120 and, via hydraulic fluid lines 114 and 54, back to tank T.

Referring now to FIG. 6, a second embodiment of the hydraulic circuit of the present invention will now briefly be described. As between FIGS. 3 and 6, like reference numerals have been assigned to like parts. For the sake of brevity, only that portion of FIG. 6 which is dissimilar to FIG. 3 will now be discussed.

An alternative manner of incorporating a flow divider/combiner valve 122 into the hydraulic circuit of the present invention contemplates coupling the valve 122 to the master cylinders 28 and 29 via respective hydraulic fluid lines 124 and 126. That is, the depth-control valve 34, when in the "F" position, communicates pressurized hydraulic fluid from pump P to the flow divider/combiner valve 122 via hydraulic fluid lines 54 and 136. Exiting the flow divider/combiner valve 122, hydraulic fluid flow is split substantially equally between master cylinders 28 and 29 via respective hydraulic fluid lines 124 and 126. Also, the depth-control valve 34, when in the "R" position, communicates pressurized hydraulic fluid from pump P to each of the slave cylinders 26 and 27 via hydraulic fluid line 128. In particular, hydraulic fluid line 130 communicates pressurized hydraulic fluid from line 128 to slave cylinder 27, and hydraulic fluid line 132 communicates pressurized hydraulic fluid from line 128 to slave cylinder 26.

Thus supplied with pressurized hydraulic fluid, the slave-and-master cylinders function substantially as described above in connection with the FIG. 3 embodiment. That is, during lowering of the tool bar 14 relative to the ground G, hydraulic fluid pressure in hydraulic lines 56 and 57 is sufficient to maintain flow-check valve 50 in its "open" position.

Similarly, pilot hydraulic-fluid line 134 communicates hydraulic fluid pressure in hydraulic fluid line 128 to pilot-operated flow-check valve 52. Such an arrangement is also discussed above (in reference to FIG. 3) in connection with lowering of the tool bar 14 relative to the ground G. Briefly stated, hydraulic fluid pressure in hydraulic fluid line 128 is sufficient to maintain the flow-check valve 52 in its "open" position to allow return of hydraulic fluid to tank T via hydraulic fluid line 54.

What has been illustrated and described are two embodiments of a hydraulic circuit able to perform both of the conventional depth-control and wing-lift functions required by modern farm machinery. The hydraulic circuit also performs a special wheel-tuck function, described above; and can further be used to control marker devices, if desired. Thus the hydraulic circuit of the present invention can be used to perform a variety of functions. While the hydraulic circuit has been illustrated and described with reference to preferred embodiments, the present invention is not limited to these embodiments. That is, the foregoing specification and preferred embodiments are intended to be illustrative and are not to be taken as limiting. Thus, alternatives, such as structural or mechanical equivalents, and other changes or modifications may become apparent to those skilled in the art upon reading the foregoing description. For example, other variations of the depth-control and wing-lift hydraulic circuit of the present invention are possible, and additional features of the hydraulic circuit will readily present themselves to those skilled in the art. Accordingly, such alternatives, changes or modifications are to be considered as forming a part of the present invention insofar as they fall within the spirit and scope of the appended claims.

We claim:

1. In an implement having a tool bar spaced above the ground, the tool bar including at least one wing pivotally connected thereto and a wing wheel mounted on the wing for operationally supporting the wing on the ground, a combined depth-control, wing-lift and wing wheel tuck circuit comprising:

depth-control means for raising and lowering the tool bar relative to the ground;

wing-lift means for causing the wing to be partially rotated about the tool-bar pivot between a substantially horizontally-disposed position and a substantially vertically-disposed position, relative to the ground; and wheel-tuck means for moving the wing wheel between an inwardly-drawn position proximate to the wing and second position spaced further from the wing than the inwardly-drawn position, and for causing the wing wheel to be disposed in one of these two wheel-spacing positions for a first preselected period of time.

2. The circuit of claim 1 further comprising:

time-sequencing means for sequentially first raising the tool bar relative to the ground before vertically disposing the wing.

3. The circuit of claim 2 wherein the circuit is a hydraulic circuit, and wherein the time-sequencing means comprises:

pump means for pressurizing hydraulic fluid and for pumping pressurized hydraulic fluid through the hydraulic circuit;

tank means for containing hydraulic fluid and for supplying hydraulic fluid to the pump means;

at least two ground-contacting tool-bar wheels mounted on the tool bar for spacing the tool bar above ground;

a plurality of hydraulic-circuit elements, including:

at least two tool-bar wheel-actuator means for raising and lowering the tool bar relative to the ground, each one of the two wheel-actuator means being separately coupled to a respective one of the two tool-bar wheels, flow divider/combiner means for substantially equally dividing hydraulic fluid flow and for combining separate hydraulic fluid flows, wing-actuator means coupled to the wing for rotating the wing about the tool bar pivot between the horizontally-disposed and vertically-disposed positions and for causing the wing to be disposed in one of these positions for a second preselected period of time, conduit means for supplying pressurized hydraulic fluid through the flow divider/combiner means and thereby splitting pressurized hydraulic fluid substantially equally between each one of the two wheel actuator means for raising the tool bar relative to the ground, for supplying pressurized hydraulic fluid to the wing actuator means for disposing the wing in the vertically-disposed position for the second preselected period of time, and for returning hydraulic fluid to the tank means, and solenoid-operated valve means for blocking flow of hydraulic fluid to the wing-actuator means until after the tool bar is first raised relative to the ground.

4. The circuit of claim 1 wherein the tool bar further includes at least one extendable and retractable marker device mounted on the tool bar, the circuit further comprising:

marker-extension means for extending the marker device from a first position relatively proximate to the tool bar to a second position outwardly disposed from the tool bar, for forming a marker furrow; and marker-return means for returning the marker device to the first position.

5. The circuit of claim 1 wherein the circuit is a hydraulic circuit, and wherein the depth-control means comprises:

pump means for pressurizing hydraulic fluid and for pumping pressurized hydraulic fluid through the hydraulic circuit;

tank means for containing hydraulic fluid and for supplying hydraulic fluid to the pump means;

at least two ground-contacting tool-bar wheels mounted on the tool bar for spacing the tool bar above the ground; and a plurality of hydraulic-circuit elements, including:

at least two tool-bar wheel-actuator means for raising and lowering the tool bar relative to the ground, each one of the two wheel-actuator means being separately coupled to a respective one of the two tool-bar wheels, flow divider/combiner means for substantially equally dividing hydraulic fluid flow and for combining separate hydraulic fluid flows, and conduit means for supplying pressurized hydraulic fluid through the flow divider/combiner means and thereby splitting pressurized hydraulic fluid substantially between each one of the two wheel-actuator means, and for returning hydraulic fluid to the tank means, thereby to effect depth-control for raising and lowering the tool bar relative to the ground.

6. The circuit of claim 1 wherein the circuit is a hydraulic circuit, and wherein the wing-lift means comprises:

pump means for pressurizing hydraulic fluid and for pumping pressurized hydraulic fluid through the hydraulic circuit;

tank means for containing hydraulic fluid and for supplying hydraulic fluid to the pump means; and a plurality of hydraulic-circuit elements, including wing-actuator means coupled to the wing for rotating the wing about the tool bar pivot between the horizontally-disposed and vertically-disposed positions and for causing the wing to be disposed in one of these positions for a second preselected period of time, and conduit means for supplying pressurized hydraulic fluid to the wing-actuator means, whereby the wing is caused to be partially rotated between the horizontally-disposed position and the vertically-disposed position, and whereby the wing is caused to be disposed in one of these two positions for the second preselected period of time.

7. The circuit of claim 1 wherein the circuit is a hydraulic circuit, and wherein the wheel-tuck means comprises:

pump means for pressurizing hydraulic fluid and for pumping pressurized hydraulic fluid through the hydraulic circuit;

tank means for containing hydraulic fluid and for supplying hydraulic fluid to the pump means;

at least two ground-contacting tool-bar wheels mounted on the tool bar for spacing the tool bar above the ground;

a plurality of hydraulic-circuit elements, including:

at least two tool-bar wheel-actuator means for raising and lowering the tool bar relative to the ground, each one of the two wheel-actuator means being separately coupled to a respective one of the two tool-bar wheels, flow divider/combiner means for substantially equally dividing hydraulic fluid flow and for combining separate hydraulic fluid flows, wing-actuator means coupled to the wing for rotating the wing about the tool-bar pivot between the horizontally-disposed and vertically-disposed positions and for causing the wing to be disposed in one of these positions for a second preselected period of time, wing wheel-actuator means coupled to the wing wheel for moving the wing wheel between the inwardly-drawn position proximate to the wing and the second position of the two wheel-spacing positions and for causing the wing wheel to be disposed in one of these two positions for the first preselected period of time when the wing is in the substantially vertically-disposed position, and conduit means for supplying pressurized hydraulic fluid through the flow divider/combiner means and thereby splitting pressurized hydraulic fluid substantially equally between each one of the two wheel actuator means for raising the tool bar relative to the ground, for supplying pressurized hydraulic fluid to the wing actuator means for disposing the wing in the vertically-disposed position for the second preselected period of time, for supplying pressurized hydraulic fluid to the wing wheel-actuator means for moving the wing wheel to the inwardly-drawn position for the first preselected period of time, and for returning hydraulic fluid to the tank means, thereby to effect wheel-tuck by disposing the wing in the vertically-disposed position and moving the wing wheel to the inwardly-drawn position.

8. The circuit of claim 4 wherein the circuit is a hydraulic circuit, and wherein the marker-extension means and the marker-return means, in combination, comprises:

pump means for pressurizing hydraulic fluid and for pumping pressurized hydraulic fluid through the hydraulic circuit;

tank means for containing hydraulic fluid and for supplying hydraulic fluid to the pump means;

a plurality of hydraulic-circuit elements, including marker-actuator means coupled to the marker for moving the marker device between the first and second positions, and conduit means for supplying pressurized hydraulic fluid to the marker-actuator means for causing the marker actuator to move the marker device to one of the first and second positions, and for returning hydraulic fluid to the tank means.

9. In a farm implement having a horizontally-disposed tool bar spaced above the ground, the tool bar including at least one wing connected to an end portion thereof through a pivot carried by the tool bar and a wing wheel mounted on the wing for operationally supporting the weight of the wing on the ground, a combined depth-control, wing-lift and wing wheel tuck hydraulic circuit comprising:

depth-control means for raising and lowering the tool bar relative to the ground;

wing-lift means for causing the wing to be partially rotated about the tool-bar pivot between a substantially horizontally-disposed position and a substantially vertically-disposed position, relative to the ground; and wheel-tuck means for moving the wing wheel between an inwardly-drawn position proximate to the wing and a second position spaced further from the wing than the inwardly-drawn position, and for causing the wing wheel to be disposed in one of these two wheel-spacing positions for a preselected period of time.

10. The hydraulic circuit of claim 9 further comprising:

time-sequencing means for sequentially first raising the tool bar relative to the ground before vertically disposing the wing.

11. The hydraulic circuit of claim 9, wherein the tool bar further includes at least one extendable and retractable marker device mounted on an end portion of the tool bar, the circuit further comprising:

marker-extension means for extending the marker device from a first position relatively proximate to the tool bar to a second position outwardly disposed from the tool bar, for forming a marker furrow; and marker-return means for returning the marker device to the first position.

12. The hydraulic circuit of claim 9 wherein the depth-control means comprises:

pump means for pressurizing hydraulic fluid and for pumping pressurized hydraulic fluid through the hydraulic circuit;

tank means for containing hydraulic fluid and for supplying hydraulic fluid to the pump means;

at least two ground-contacting tool-bar wheels mounted on the tool bar for supporting the weight of the tool bar on the ground and for causing the tool bar to be disposed substantially level with the ground; and a plurality of hydraulic-circuit elements, including:

at least two tool-bar wheel-actuator means for levelly raising and lowering the tool bar relative to the ground, each one of the two wheel-actuator means being separately coupled to a respective one of the two tool-bar wheels, flow divider/combiner means for substantially equally dividing hydraulic fluid flow and for combining separate hydraulic fluid flows, and conduit means for supplying pressurized hydraulic fluid through the flow divider/combiner means and thereby splitting pressurized hydraulic fluid substantially between each one of the two wheel-actuator means, and for returning hydraulic fluid to the tank means, thereby to effect depth-control for levelly raising and lowering the tool bar relative to the ground.

13. The hydraulic circuit of claim 9 wherein the wing-lift means comprises:

pump means for pressurizing hydraulic fluid and for pumping pressurized hydraulic fluid through the hydraulic circuit;

tank means for containing hydraulic fluid and for supplying hydraulic fluid to the pump means; and a plurality of hydraulic-circuit elements, including wing-actuator means coupled to the wing for rotating the wing about the tool bar pivot between the horizontally-disposed and vertically-disposed positions and for causing the wing to be disposed in one of these positions for a second preselected period of time, and conduit means for supplying pressurized hydraulic fluid to the wing-actuator means, whereby the wing is caused to be partially rotated between the horizontally-disposed position and the vertically-disposed position, and whereby the wing is caused to be disposed in one of these two positions for the second preselected period of time.

14. The hydraulic circuit of claim 9 wherein the wheel-tuck means comprises:

pump means for pressurizing hydraulic fluid and for pumping pressurized hydraulic fluid through the hydraulic circuit;

tank means for containing hydraulic fluid and for supplying hydraulic fluid to the pump means;

at least two ground-contacting tool-bar wheels mounted on the tool bar for supporting the weight of the tool bar on the ground and for causing the tool bar to be disposed substantially level with the ground;

a plurality of hydraulic-circuit elements, including:

at least two tool-bar wheel-actuator means for levelly raising and lowering the tool bar relative to the ground, each one of the two wheel-actuator means being separately coupled to a respective one of the two tool-bar wheels, flow divider/combiner means for substantially equally dividing hydraulic fluid flow and for combining separate hydraulic fluid flows, wing-actuator means coupled to the wing for rotating the wing about the tool-bar pivot between the horizontally-disposed and vertically-disposed positions and for causing the wing to be disposed in one of these positions for a second preselected period of time, wing wheel-actuator means coupled to the wing wheel for moving the wing wheel between the inwardly-drawn position proximate to the wing and the second position of the two wheel-spacing positions and for causing the wing wheel to be disposed in one of these two positions for the first preselected period of time when the wing is in the substantially vertically-disposed position, and conduit means for supplying pressurized hydraulic fluid through the flow divider/combiner means and thereby splitting pressurized hydraulic fluid substantially equally between each one of the two wheel actuator means for levelly raising the tool bar relative to the ground, for supplying pressurized hydraulic fluid to the wing actuator means for disposing the wing in the vertically disposed position for the second preselected period of time, for supplying pressurized hydraulic fluid to the wing wheel-actuator means for moving the wing wheel to the inwardly-drawn position for the first preselected period of time, and for returning hydraulic fluid to the tank means, thereby to effect wheel-tuck by disposing the wing in the vertically-disposed position and moving the wing wheel to the inwardly-drawn position.

15. The hydraulic circuit of claim 10 wherein the time-sequencing means comprises:
pump means for pressurizing hydraulic fluid and for pumping pressurized hydraulic fluid through the hydraulic circuit;
tank means for containing hydraulic fluid and for supplying hydraulic fluid to the pump means;
at least two ground-contacting tool-bar wheels mounted on the tool bar for supporting the weight of the tool bar on the ground and for causing the tool bar to be disposed substantially level with the ground;
a plurality of hydraulic-circuit elements, including:
at least two tool-bar wheel-actuator means for levelly raising and lowering the tool bar relative to the ground, each one of the two wheel-actuator means being separately coupled to a respective one of the two tool-bar wheels,
flow divider/combiner means for substantially equally dividing hydraulic fluid flow and for combining separate hydraulic fluid flows, wing-actuator means coupled to the wing for rotating the wing about the tool bar pivot between the horizontally-disposed and vertically-disposed positions and for causing the wing to be disposed in one of these positions for a second preselected period of time,
conduit means for supplying pressurized hydraulic fluid through the flow divider/combiner means and thereby splitting pressurized hydraulic fluid substantially equally between each one of the two wheel actuator means for levelly raising the tool bar relative to the ground, for supplying pressurized hydraulic fluid to the wing actuator means for disposing the wing in the vertically-disposed position for the second preselected period of time, and for returning hydraulic fluid to the tank means, and
solenoid-operated-valve means for blocking flow of hydraulic fluid to the wing-actuator means until after the tool bar is first raised relative to the ground.

16. The hydraulic circuit of claim 11 wherein the marker-extension means and the marker-return means, in combination, comprises:
pump means for pressurizing hydraulic fluid and for pumping pressurized hydraulic fluid through the hydraulic circuit;
tank means for containing hydraulic fluid and for supplying hydraulic fluid to the pump means;
a plurality of hydraulic-circuit elements, including
marker-actuator means coupled to the marker for moving the marker device between the first and second positions, and
conduit means for supplying pressurized hydraulic fluid to the marker-actuator means for causing the marker actuator to move the marker device to one of the first and second positions, and for returning hydraulic fluid to the tank means.

* * * * *